United States Patent [19]
Barron

[11] Patent Number: 5,213,287
[45] Date of Patent: May 25, 1993

[54] WING MODIFICATION METHOD AND APPARATUS

[76] Inventor: David R. Barron, 1015 Graf Road, Kelowna, British Columbia, Canada, V1Y 7R1

[21] Appl. No.: 787,597

[22] Filed: Nov. 4, 1991

[51] Int. Cl.⁵ .......................... B64C 3/16; B64C 23/00
[52] U.S. Cl. .................................. 244/130; 244/198; 244/215; 244/199; 244/91
[58] Field of Search ............... 244/198, 199, 218, 216, 244/215, 91, 124, 130

[56] References Cited

U.S. PATENT DOCUMENTS

| | | | |
|---|---|---|---|
| 2,375,858 | 5/1945 | Makaroff | 244/218 |
| 2,661,166 | 12/1953 | Gordon | 244/216 |
| 2,920,844 | 1/1960 | Marshall et al. | 244/130 |
| 3,411,738 | 11/1968 | Sargent | 244/199 |
| 3,430,898 | 3/1969 | Parechanian et al. | 244/123 |
| 3,659,810 | 5/1972 | Robertson | 244/215 |
| 4,108,403 | 8/1978 | Finch | 244/199 |
| 4,240,597 | 12/1980 | Ellis et al. | 244/199 |
| 4,334,658 | 6/1982 | MacKenzie | 244/198 |
| 4,642,028 | 2/1987 | Buckman et al. | 416/95 |
| 4,667,906 | 5/1987 | Suarez et al. | 244/124 |
| 4,880,355 | 11/1989 | Vuillet et al. | 416/228 |

FOREIGN PATENT DOCUMENTS

| | | |
|---|---|---|
| 224422 | 10/1922 | Canada . |
| 416675 | 11/1943 | Canada . |
| 429828 | 9/1945 | Canada . |
| 571374 | 2/1959 | Canada . |
| 597290 | 5/1960 | Canada . |
| 711625 | 6/1965 | Canada . |
| 716448 | 8/1965 | Canada . |

OTHER PUBLICATIONS

Hicks et al., "Effects of Forward Contour Modif. on the Aerody. Charac. of NACA 64₁-212 Airfoil Section", NASA TM X-3293, Sep. 1975.
Abstract from NASA research publication entitled "Wind Tunnel Results of the Low-Speed NLF (Natural Flow Control) (1)-0414F Airfoil", Dec. 1987.

Primary Examiner—Galen Barefoot
Attorney, Agent, or Firm—John Russell Uren

[57] ABSTRACT

A modification kit for the DeHavilland DH-2 Beaver and the DH-3 Otter aircraft. A replacement leading edge is provided for the wing together with replacement droop wing tips and a wing fence. A flap gap seal is provided to close the gap between the trailing edge of the wing and the leading edge of the flaps when the flaps are extended. The addition of these modifications modifies the performing characteristics of the airplane in an enhanced manner, particularly during take off and landing.

8 Claims, 9 Drawing Sheets

WING MODIFICATION METHOD AND APPARATUS

INTRODUCTION

This invention relates to a modification kit used for the DeHavilland DH-2 Beaver and the DH-3 Otter aircraft and, more particularly, to a modification which includes a gap seal for the open area between the leading edge of the flaps and the trailing edge of the wing, a replacement leading edge assembly for the wings, wing tip replacements and a stall fence for the wing.

BACKGROUND OF THE INVENTION

The DeHavilland DH-2 Beaver aircraft, manufactured by DeHavilland Aircraft of Canada Ltd and first flown in 1947, was an STOL, single engine, metal, cabin monoplane transport designed principally for Canadian bush flying on floats, skis or wheels although the U.S. Army was a major purchaser of the type. The Beaver has been used for bush flying for many years. Although currently out of production, many of the 1700 Beaver aircraft built continue to be carefully maintained and used daily throughout the world, particularly in bush operations. The aircraft is known for its reliability and strength in such operations.

The DeHavilland DH-3 Otter aircraft, first flown in 1951, was also principally flown in bush operations as a utility transport with larger seating capacity than the Beaver. It likewise has a reputation for reliability and strength and many of the 460 aircraft manufactured continue to fly and are carefully maintained.

While the flying characteristics of the aircraft are very satisfactory, the several modifications according to the present invention have been discovered which, taken both singly and in combination, enhance the flight characteristics of both aircraft. While it is not known conclusively why these modifications produce such improved flying characteristics, the explanations given herein are believed to be correct to the best of applicant's knowledge at the present date.

The first modification relates to changing the profile of the leading edge of the wing of the Beaver and Otter aircraft. By adding a cuff of 2024 T3 aluminum having a thickness of 0.032 inches to the leading edge of the wing in a profile as described hereafter, the flight characteristics of the aircraft are enhanced. A plurality of blocks made from FR 3720 polyurethane foam having the desired contour are mounted to the leading edge of the original wing. The aluminum material is then fitted over the blocks and attached to the wing. Suitable provisions are made in the modification for the pitot tube, inboard fairings, air intake and landing lights, all as will be described.

A second modification relates to a droop wing tip modification used to cover the original wing tip tank and is also applicable to both aircraft. The wing tip modification is made from S Class fibreglass. It is intended to fit smoothly with the leading edge modification and has a notable change in configuration from the original which leads to the "droop" modifier. Suitable provisions are made for the navigation light, the filler cap and the drain, all as will be described.

A third modification relates to a flap gap seal modification. This installation is used to cover the gap between the flap and the trailing edge of the wing. The flap gap seal prevents the passage of a large portion of moving air through the gap when the flap is moved to its extended position and is applicable only to the Beaver aircraft. The seal assists the stability of the aircraft in flap extended flight and enhances the takeoff and general flight characteristics in conjunction with the other modifications made to the leading edge of the wing and to the droop wing tip.

A fourth and final modification relates to a stall fence installed on the top of the wing just outside the flap area. This modification is likewise applicable only to the Beaver aircraft.

SUMMARY OF THE INVENTION

According to one aspect of the invention, there is provided a cuff attachable to the leading edge of the wing of a DeHavilland Beaver or Otter aircraft, said cuff extending forwardly from the leading edge of the wing and being fitted over a plurality of blocks mounted intermittently across the width of said leading edge, said cuff extending smoothly from the top of said wing in a generally convex profile to a point approximately 2 inches forwardly and 4 inches below the forwardmost point of said wing, said cuff then extending in a generally linear line rearwardly to the bottom of said wing at a point approximately 7 inches rearwardly of said forwardmost point of said wing.

According to a further aspect of the invention, there is provided a tip for the wing of a DeHavilland Beaver or Otter aircraft, said tip having inboard, outboard, leading and trailing areas, said tip being generally concave at said trailing edge between said inboard and outboard positions and the outboard and trailing edge being located below the outboard and leading edge of said tip.

According to a further aspect of the invention, there is provided a seal positioned within the gap between the respective flap and the trailing edge of each wing on a DeHavilland Beaver aircraft, said seal extending substantially the length of the flap cove of said aircraft and being attached to the bottom skin of said wing, said seal extending rearwardly from the trailing edge of said wing a distance such that the leading edge of the bottom of said flap is overlapped by said seal when said flap is in its retracted position, said seal covering substantially the entire gap between said flap and said trailing edge of said wing when said flap is in its extended position.

According to a further aspect of the invention, there is provided a stall fence located on the top of the wing of a DeHavilland Beaver aircraft, said stall fence being positioned adjacent to and outside the flap on each respective wing, said stall fence extending smoothly from the leading edge of said wing to the trailing edge, the top profile of said stall fence being general parallel to the upper profile of said wing aft of said leading edge and at a distance of approximately 2 inches from the upper surface of said wing.

BRIEF DESCRIPTION OF THE SEVERAL VIEWS OF THE DRAWINGS

An embodiment of the invention will now be described, by way of example only, with the use of drawings in which.

DESCRIPTION OF SPECIFIC EMBODIMENT

Figure 1:
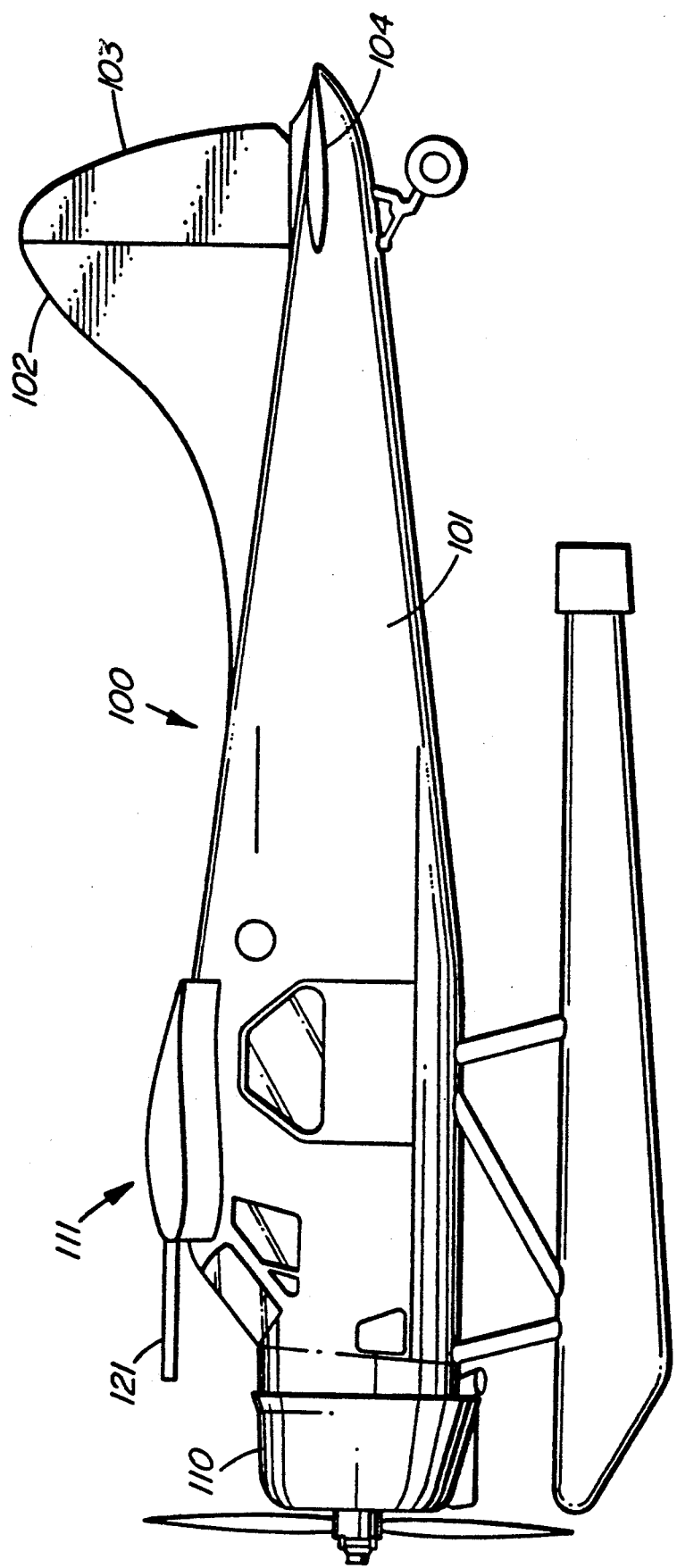
FIG. 1 is a side view of the wing of a DeHavilland Beaver aircraft in its unmodified production configuration.

Referring now to the drawings, a DeHavilland DH-2 Beaver aircraft in its factory or production configuration is illustrated generally at 100 in FIG. 1. The aircraft 100 comprises the fuselage 101, the tail section generally illustrated at 102 which comprises the rudder 103 and the horizontal stabilizer 104, the engine area 110 which includes a 450 H.P. Pratt & Whitney R-985 powerplant and the wings generally illustrated at 111, the left hand wing of which is illustrated at 124 in FIG. 2A.

Figure 2A:
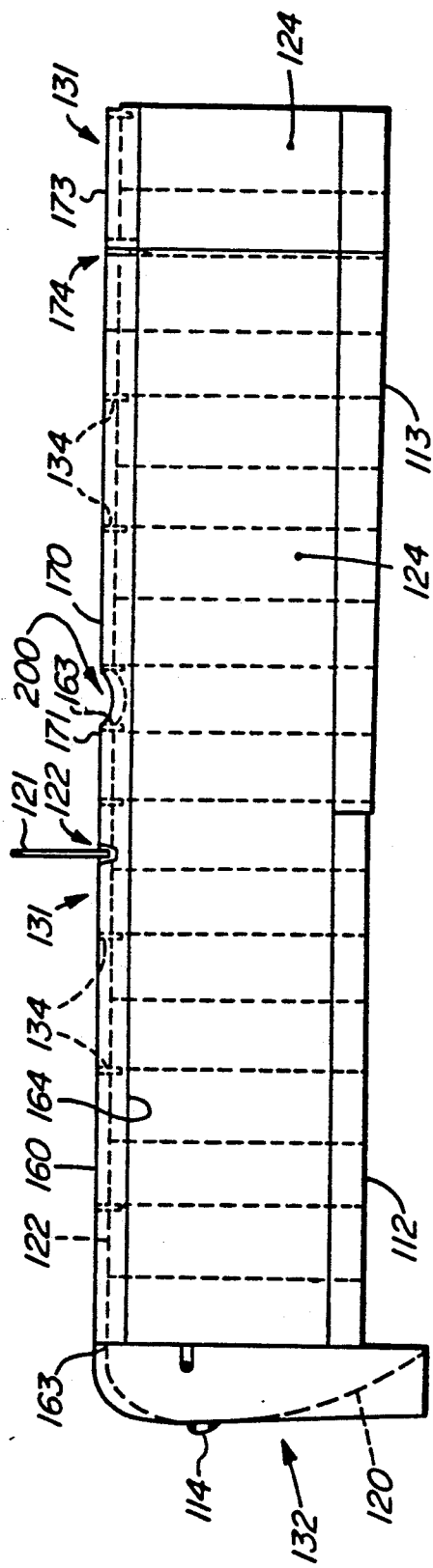
FIG. 2A is an elevation view of the wing of the aircraft of FIG. 1 illustrating the modified leading edge and wing tip installed on the wing.

Referring to FIG. 2A, the wing 124 includes an aileron 112 and a flap 113 inboard of the aileron 111. A navigation light 114 is located on the wing tip 120 of each of the wings 124 and a pitot tube 121 is mounted on the leading edge of the wing 124 outboard of the flaps 113. The wing 124 illustrated in FIG. 2A includes the leading edge modification generally illustrated at 131 and the droop wing tip modification generally illustrated at 132.

With particular reference to the leading edge modification shown in FIG. 2A, the wings 111 (FIG. 1) are removed from the aircraft 100 to incorporate the leading edge modification 131. Only the left hand wing 124 will be described in respect of the leading edge modification, it being understood that the operation will be identical for the right wing.

Figure 2B:
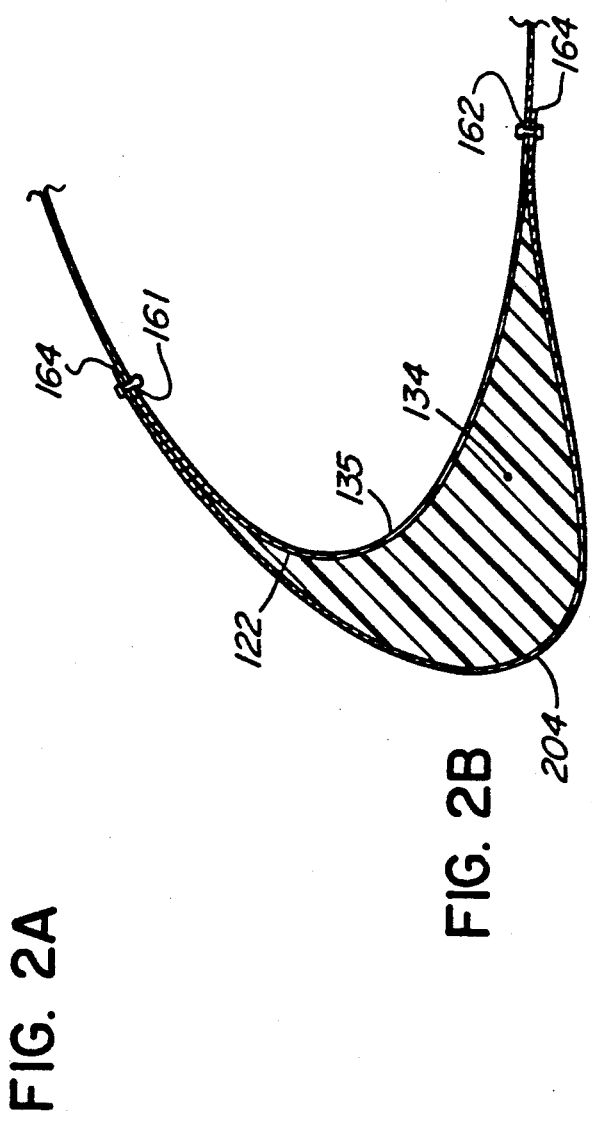
FIG. 2B is a sectional view of the wing of FIG. 2A illustrating the profile of the modified leading edge in association with the blocks used to establish the profile.
Figure 2C:
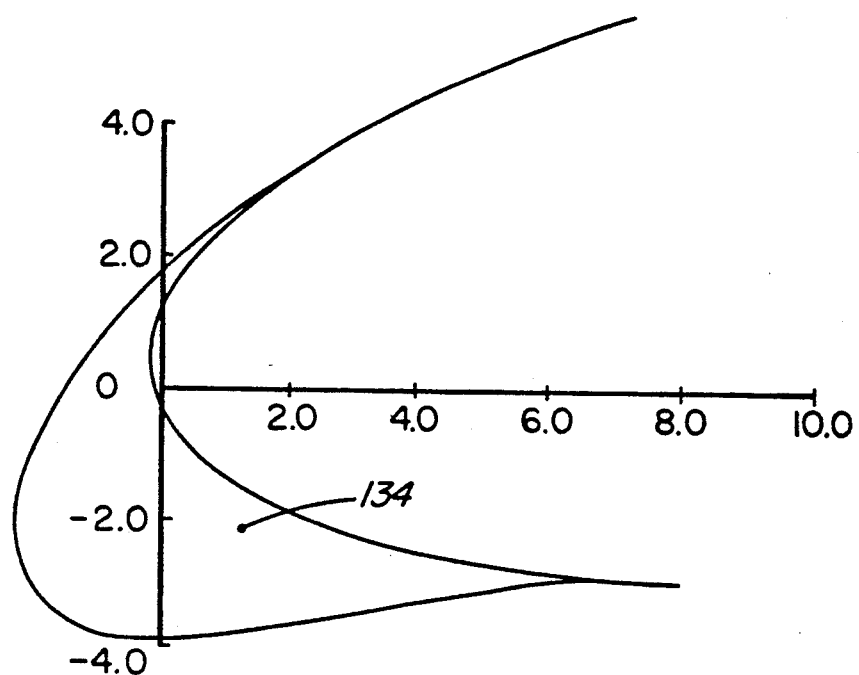
FIG. 2C is a view of the profile used for the blocks that set the configuration of the leading edge of the wing.

Following the removal of the wing 124, the original wing tip 120, the landing light 115 (FIG. 2H) and the pitot tube 121 are removed from the wing 124. A plurality of nose blocks 134 conveniently made from FR 3720 rigid polyurethane foam are cut to the shape illustrated in FIGS. 2B and 2C. Eleven (11) such blocks are cut for each of the wings 124 and their positions, when placed in correct configuration on the wing 124, are illustrated in FIG. 2A. The leading edge 122 of the original wing 124 is thoroughly cleaned to remove any wax and other buildup such as dirt or oil. In each of the stations where the nose blocks 134 are to be mounted, it is convenient to lightly scuff the surface of the wing 124 to remove any dead paint still adhering to the surface.

The back 135 of each of the nose blocks 134 is covered with an appropriate adhesive, conveniently SILASTIC 732 (Trademark), and the respective nose blocks 134 are placed in the positions illustrated in FIG. 2A. Specifically, the nose blocks 134 are placed with their inboard edges at stations 1.25, 29.75, 57, 84, 111, 123.5, 138, 165, 192 and 219. The nose block 134 positioned at station 246 has its outboard edge placed at this station. The nose blocks 134 are then held in place with clamps, masking tape or otherwise for a period of approximately twelve (12) hours for curing purposes. Each block 134 must be in its proper position within ten (10) minutes following the application of the SILASTIC adhesive.

There are three leading edge cuff sections for each wing 124 and after the nose blocks 134 have been cured in their respective positions, the outboard leading edge cuff 160 is temporarily installed in position, conveniently with tension straps. The outboard leading edge cuff 160 will previously have been drilled with holes within which the rivets will eventually be mounted, the holes 161 (FIG. 2B) on the top of the leading edge cuff 160 and the holes 162 on the bottom of the leading edge cuff 160 being spaced 1.5" apart with a 5/16" distance both from the lateral edges 163 (FIG. 2A) and from the rearward edges 164.

The rivet holes 161, 162 are drilled through into the leading edge 122 of the unmodified wing 124. CLECO fasteners are then inserted into the holes 161, 162 and used to hold the leading edge cuff 160 to the wing 124 in correct position.

Figure 2D:
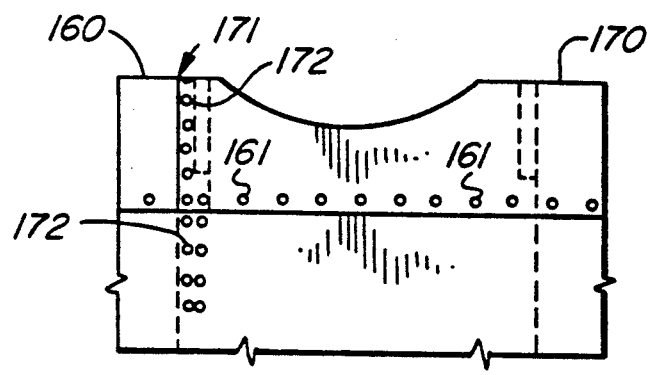
FIG. 2D is an elevation view of the landing light cutout and a typical lap joint used in the leading edge modification.

The inboard leading edge cuff 170 (FIG. 2A) is then similarly installed. A lap joint 171 (FIG. 2D) is created between the outboard and inboard leading edge cuffs 160, 170 in which the outboard leading edge cuff 160 is overlapped by 1¼". The previously drilled rivet holes 172 are aligned and CLECO fasteners are used to maintain the inboard and outboard edge cuffs 160, 170 in proper position. The rivet holes 161 in inboard leading edge cuff 170 are drilled into the original leading edge 122 and CLECO fasteners are inserted into the holes to maintain the proper position as drilling continues in a method identical to that used with the outboard leading edge cuff 160.

Figure 2E:
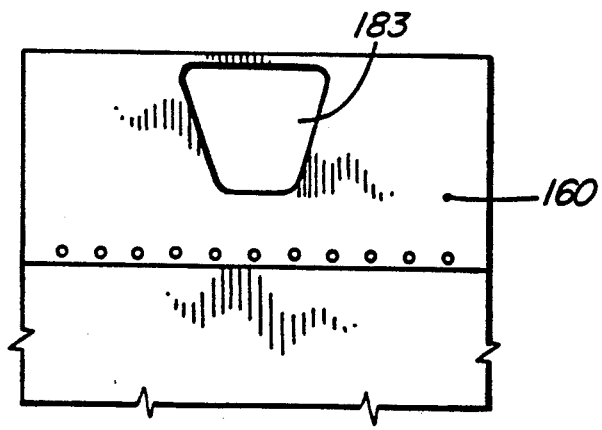
FIG. 2E is a view of the pitot tube access cutout used for the leading edge modification.
Figure 2F:
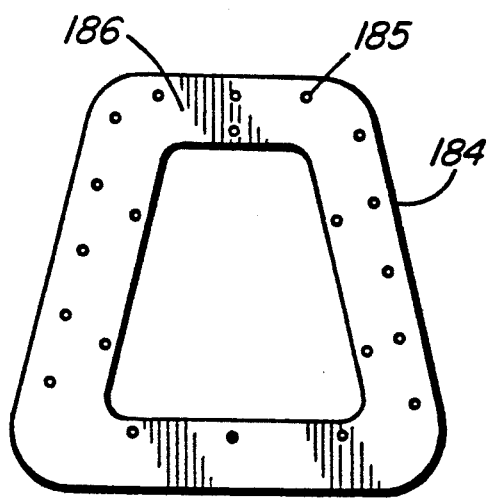
FIG. 2F is a view of the skin doubler used about the periphery of the pitot tube access cutout of FIG. 2E.
Figure 2G:
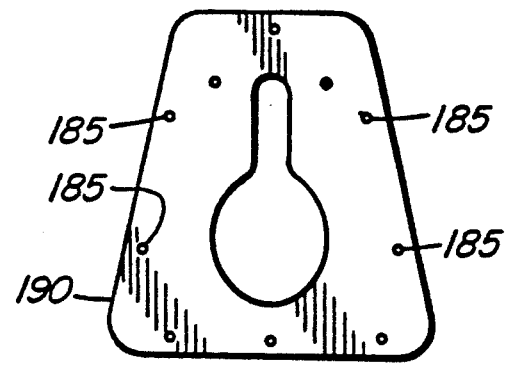
FIG. 2G is a view of the pitot tube cutout used with the pitot tube access cutout of FIGS. 2E and 2F.
Figure 2H:
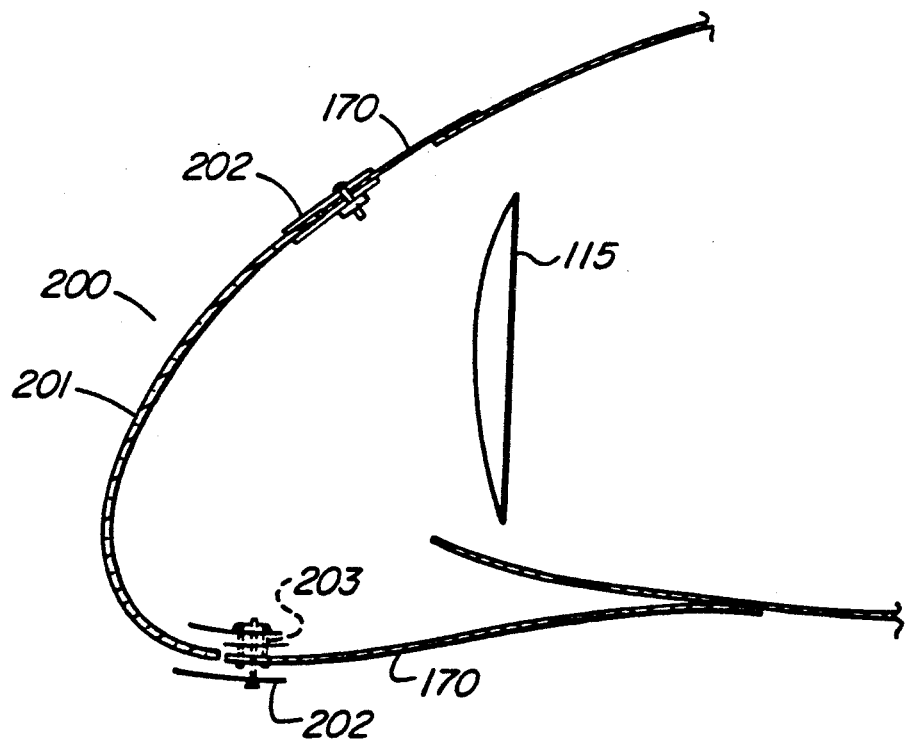
FIG. 2H is a side profile view of the landing light modification with the new leading edge.

The left hand inboard fairing 173 (FIG. 2J) is then similarly installed. A lap joint 174 is created in which the fairing 173 overlaps the inboard leading edge cuff 170 by 1¼". The previously drilled holes 180 in the inboard leading edge cuff 170 are aligned with the corresponding holes 180 in the inboard fairing 173. MS 832 anchor nuts are conveniently installed in the aligned holes 180 at 3" intervals as indicated. The previously drilled rivet holes 161 in the inboard fairing 173 are drilled into the leading edge of the original fairing 181 and CLECO fasteners are inserted into the holes to maintain the proper positioning of the fairing 173 as drilling continues.

There are three areas that require particular attention during the installation of the leading edge cuffs 160, 170.

A first area for attention is the pitot tube area 182 (FIG. 2A). A cutout 183 (FIG. 2E) is provided in the outboard leading edge cuff 160. A skin doubler 184 (FIG. 2F) is installed over the cutout 183 with rivets installed in holes 185 as indicated. A pitot tube cover 190 (FIG. 2G) is installed over the skin doubler 184 with rivets installed in holes 185 and anchor nuts installed in holes 186 (FIG. 2F) as indicated.

Figure 2I:
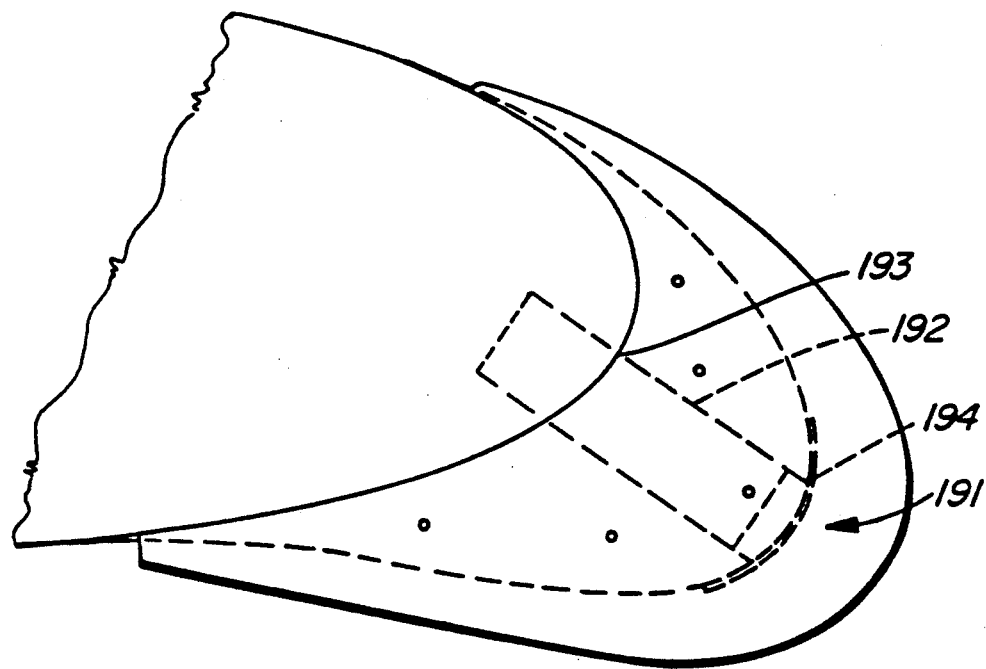
FIG. 2I is a side view of the area of the wing illustrating the air dam fence and the outside air vent.
Figure 2J:
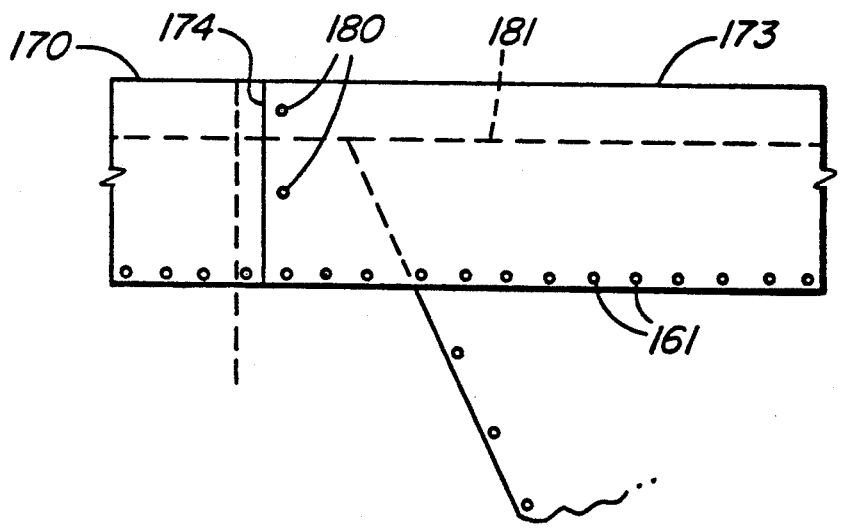
FIG. 2J is a plan view of the inboard fairing leading cuff and the lap joint positioned at that station.

A second area for attention is the air vent area shown generally at 191 (FIGS. 2A and 2I). A scat hose 192 is used to extend from the original outside air receptacle 193 to the outside air receptacle 194 at the position indicated in the inboard fairing 173.

The third area of attention is the landing light area generally denoted 200 (FIGS. 2A and 2H). A 3/32" plexi glass lens 201 is installed as illustrated in FIG. 2H with the use of a lens retainer 202 connected to the top and bottom of the inboard cuff leading edge cuff 170 and the lens 201 with rivets 203. The original landing light 115 remains in its production position.

Following the fit and location steps involved with each of the outboard leading edge cuff 160, the inboard leading edge cuff 170 and the inboard fairing 173, they are then removed. All holes for rivets and anchor nuts are burred slightly.

The final installation of the outboard and inboard leading edge cuffs 160, 170 and the inboard fairing 173 then occurs. The inside of each of the members 160, 170, 173 is cleaned and an adhesive, conveniently SILASTIC adhesive, is applied to the forward face 204 (FIG. 2B) of the nose blocks 134 and along the top row of rivet holes 161. The outboard leading edge cuff 160 is installed initially. CLECO fasteners are used on the top and bottom holes 161, 162 and the rivets are then installed, completing the riveting operation in the top of the leading edge cuff 160 first. Following the completion of the riveting operation on the outboard leading edge cuff 160, the inboard leading edge cuff 170 is installed using the same procedure. The scat hose 192 (FIG. 2I) and the outside air receptacle 194 should also be installed at this time.

The landing light lens 201 (FIG. 2H), the pitot tube 121 (FIG. 1) and the pitot tube cover (FIGS. 2E, 2F and 2G) are also installed at this time.

Figure 3A:
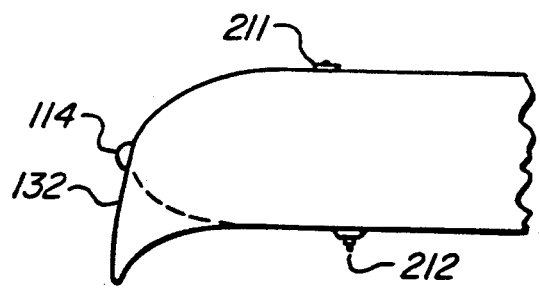
FIG. 3A is a rear view of the droop wing tip modification looking forward from aft of the aircraft.
Figure 3B:
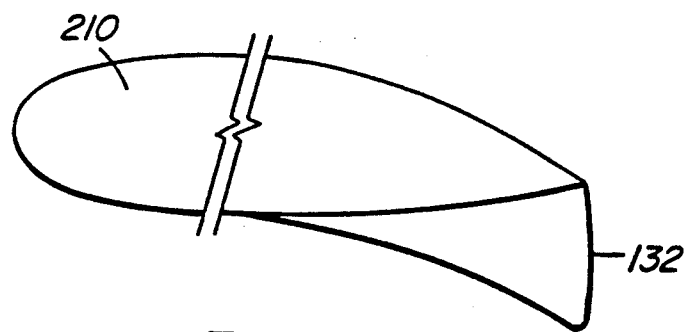
FIG. 3B is a side view of the droop wing tip of FIG. 3A.

Referring now to the droop wing tip modification 132 as illustrated in FIGS. 2A, 3A and 3B, the droop wing tip 132 is positioned over the tip tank 210 (FIG. 3B) and is then fastened into place using the original fastener locations and using the original filler cap 211 (FIG. 3A) and drain 212. The original navigation light 114 is reinstalled in the droop wing tip 132.

The leading edge cuff modification and the droop wing tip modification are applicable to both the Beaver and Otter aircraft.

Reference is now made to the flap gap seal modification 140 illustrated in FIGS. 4A, 4B, 4C and 4D. The flap gap seal 234 is operatively positioned across the entire length of the flaps 113 and is connected to the lower edge 133 of the wing 123.

Figure 4B:
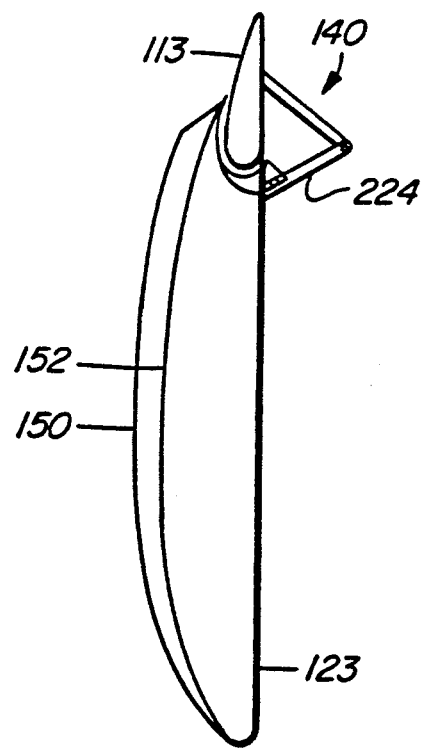
FIG. 4B is a side view of the wing of FIG. 4A illustrating the flap in its retracted position and the stall fence according to an embodiment of the invention.
Figure 4A:
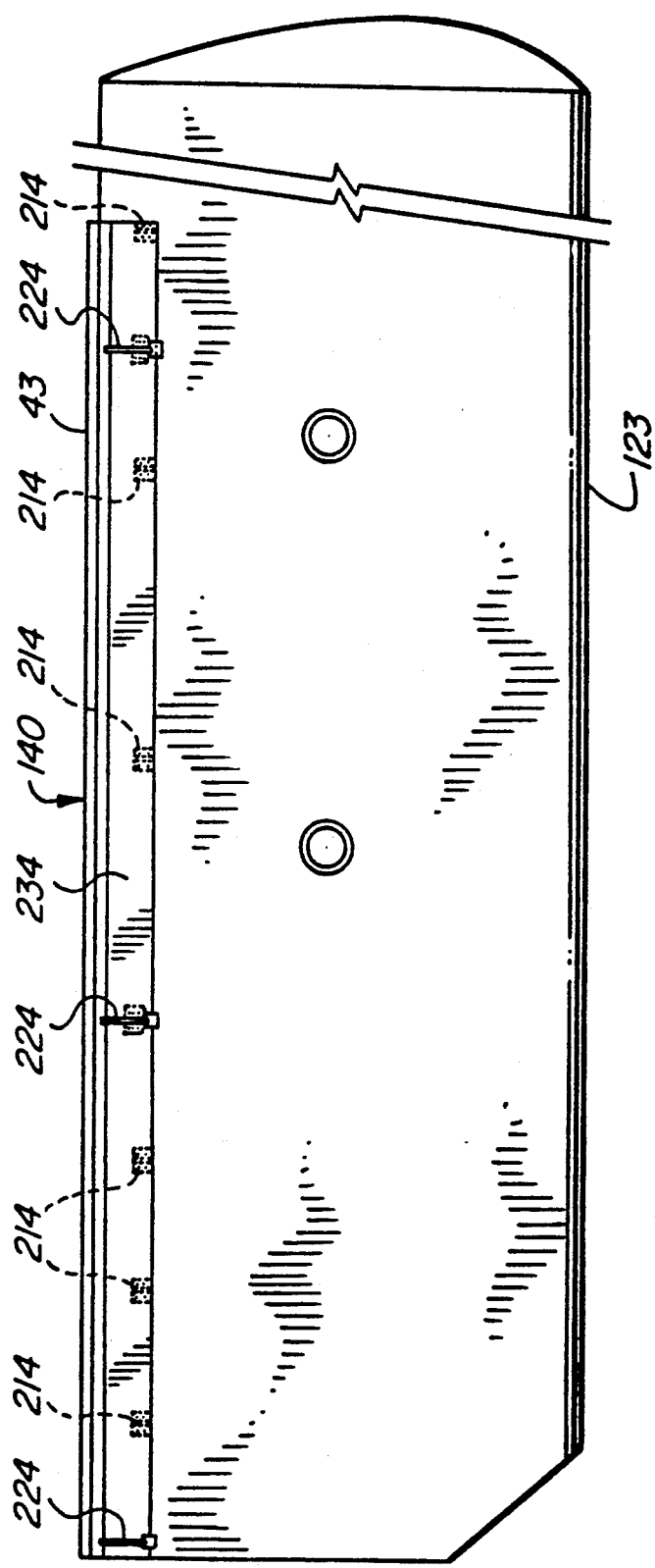
FIG. 4A is a bottom view of the wing illustrating the installed flap gap seal according to the invention.
Figure 4C:
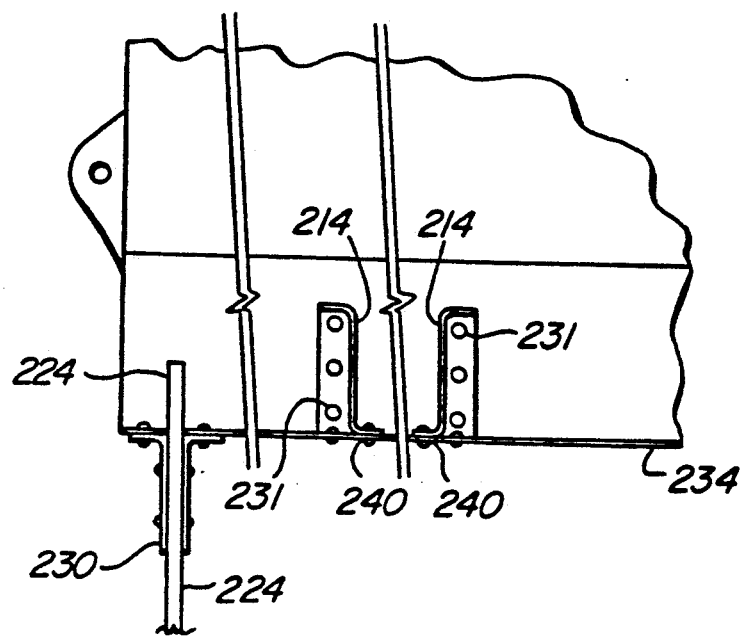
FIG. 4C is a partial rear view of the wing of FIG. 4A particularly illustrating the flap hangers and the flap recess brackets.

The flap 113 (FIG. 4B) is removed from the wing 123 and the rivets 213 (FIG. 4D) on the bottom of the trailing edge of the wing spar 123 are removed. A plurality, conveniently six (6), flap seal mounting brackets 214 (FIGS. 4A and 4C) are mounted on the flap cove skin 220 (FIG. 4D) with rivets 231 with the bottom leg 221 of the flap cove mounting bracket 214 extending between the rear spar 222 and the bottom skin 233 of the wing 123 (FIG. 4D). The flap seal mounting brackets 214 are conveniently made from 0.032 2024T3 aluminum material.

Figure 4E:
FIG. 4E is a side view of a foam flap cove mounting bracket.
Figure 4D:
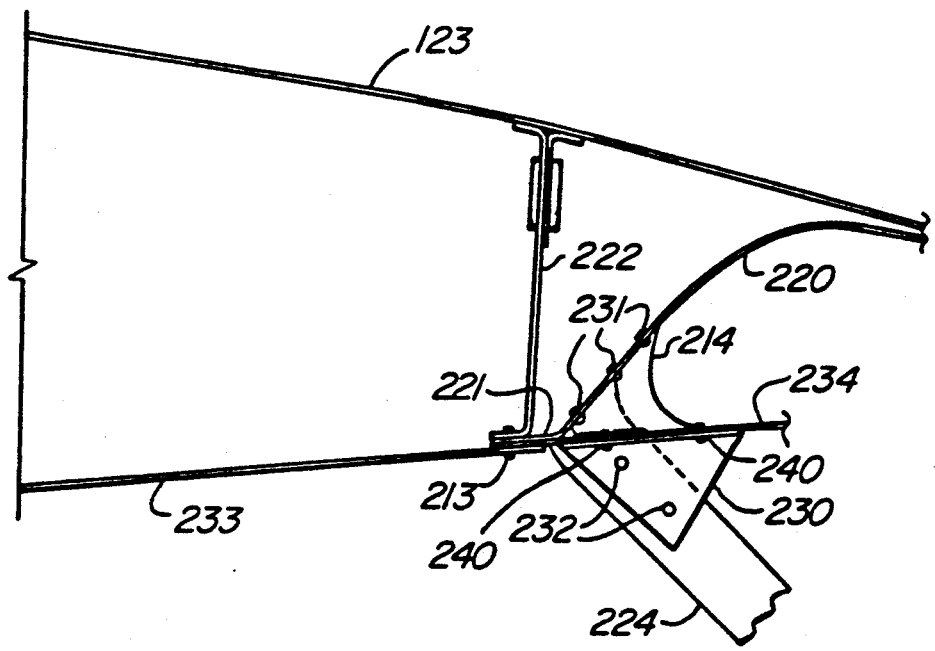
FIG. 4D is a side view of the trailing edge of the wing of FIG. 4A but without the attached flap.

An alternative and preferred installation is to use FR 3720 rigid polyurethane foam, the same material as is used for the nose blocks 134, in place of the 2024T3 aluminum material for the flap seal mounting brackets 214 as seen in FIG. 4E. In such event, rivets 231 will not be utilized. Rather, the foam blocks 214 will simply be held in position by the adhesive, again and conveniently, SILASTIC 732 adhesive.

There are three flap hangers 224 mounted on wing 123 (FIGS. 4A and 4B). At the location of each flap hanger 224, two flap seal brackets 230 (FIG. 4C and 4D) are mounted on opposite sides of the flap hanger 224 with rivets 232 as illustrated in FIG. 4D.

The flap cove skin 220 is slipped under the bottom of skin 233 of wing 123 and the gap seal 234 is positioned between the flap cove skin 220 and the bottom skin 233 of the wing 123.

The gap seal 234 extends the length of the flap 113 between the trailing lower edge of wing 123 and the leading edge of flap 113 as seen in FIG. 4A. The position of the gap seal 234 must be carefully adjusted prior to final location. To that end, a clearance distance between the gap seal 234 and the leading edge of the flap 113 is ⅛" when flap 113 is in its extended position and such gap should be uniform from the inboard to the outboard ends over the distance of the flap 113. The adjustment is facilitated by use of the flap seal mounting brackets 214.

Rivet holes are drilled through the gap seal 234 and the gap seal 234 is securely but temporarily held in place with the flap seal mounting brackets 214. The gap seal 234 should be substantially flush with the bottom skin of the wing 233 and the bottom surface of flap 113.

After alignment, two holes 240 are then drilled through the gap seal 234. The gap seal 234 is riveted to the flap seal brackets 230 at each of the nine locations of the flap hangers 224.

The gap seal 234 is manufactured from 0.040 2024 T3 aluminum material. It is painted as desired.

The flap 113 is then reinstalled.

Figure 5:
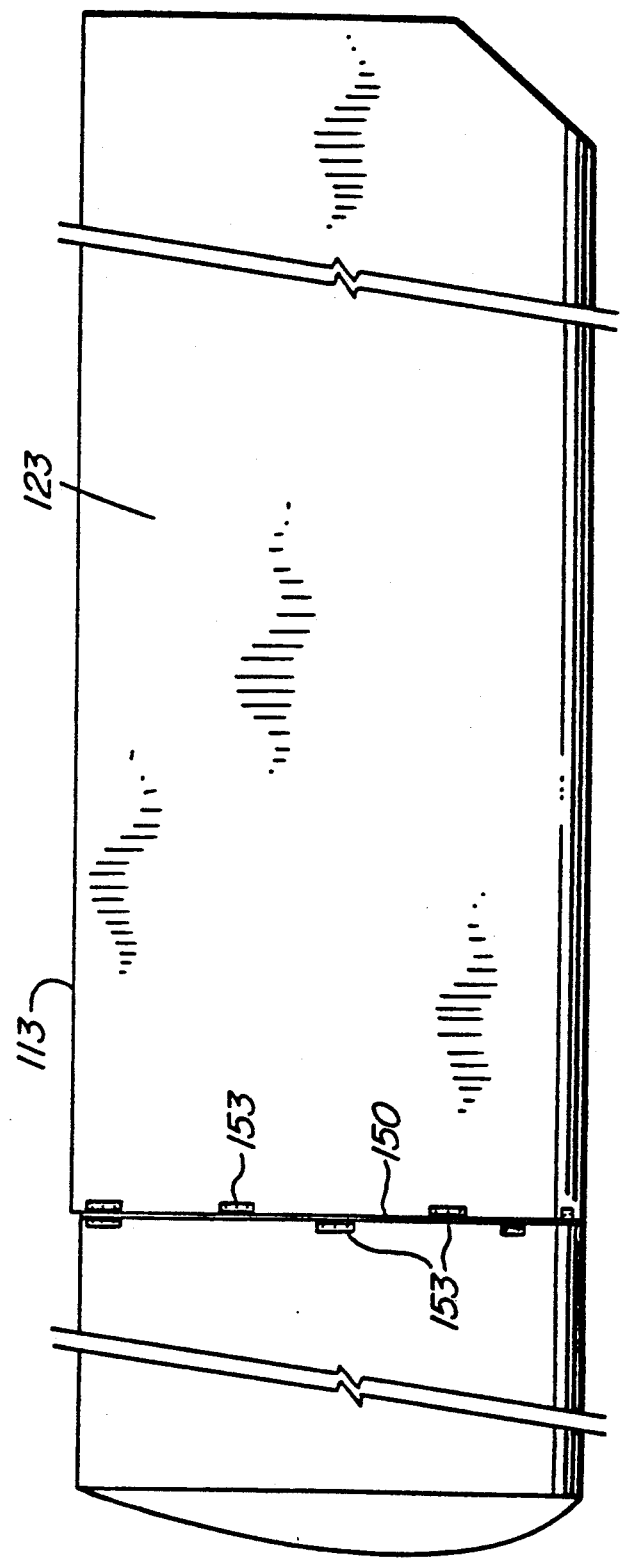
FIG. 5 is a plan view of the wing illustrating the stall fence of FIG. 4B.

The wing stall fence is generally illustrated at 150 in FIGS. 4B and 5. A single fence 150 is mounted on each of the wings 111, right hand wing 123 being shown in each of FIGS. 4A and 4B. Each fence 150 is mounted on the top of the respective one of the wings 111, just outside the area of the flaps 113 as seen in FIG. 5.

The wing stall fence 150 extends along the top of each wing generally parallel to the top wing surface 152 (FIG. 4B). It tapers smoothly from a position generally flush with the leading edge of wing 123 to a distance approximately 2 inches from the surface 152 of the wing 123 until a position close to the trailing edge of the top of wing 123 is reached. The stall fence 150 is connected to the wing 123 by the use of seven (7) stall fence brackets 153 located as indicated in FIG. 5. Rivets are used to attach the stall fence 150 to the stall fence brackets 153 and the stall fence brackets 153 to the top of wing 123.

The wing stall fence 150 installation is applicable only to the Beaver aircraft.

OPERATION

In operation, the leading edge modification 131, the wing stall fence 150 and the droop wing tip 132 are passive and not controlled by the pilot. The degree of their influence does, however, depend on the flight altitude of the aircraft. The effect of the added flap gap seal 140, however, is determined by the operator in association with the operation of the flaps 113; that is, when the flaps 113 are extended by the operator the flap gap seal 140 has been found to give the airplane enhanced performance characteristics. Although it is not intended to bind the patentee, the flight characteristics which have resulted during two initial test flights will be described. First, the takeoff characteristics have been improved by allowing the plane, in its float configuration, to get on the step more quickly. Indeed, takeoff can occur without the use of flaps. Once lift off has occurred, it has been found the climb rate is much improved without the need for flaps since wing lift is enhanced. The kit further offers improved stability on the ailerons and a high nose climb configuration.

Secondly, the stall and cruise characteristics have also been improved. Stall recovery has been enhanced; recovery seems to be almost automatic when the controls are released and without pilot input. Likewise, when on approach for landing, the aircraft appears to have substantially increased stability. As well, the flying attitude at cruise speed appears to be improved.

It is generally agreed that the improved flight characteristics, set out above, are obtained in the Beaver and Otter aircraft with the combination of the leading edge modification, the droop wing tip and the flap gap seal. Nevertheless, it is also noted that flight characteristics are improved with each modification taken individually. For example, it is believed that the use of the leading edge modification specifically allows the plane to fly in a nose high attitude both during climb and acceleration. The wing tips allow the plane to be flown with greater maneuverability at slow speeds since it is believed they keep and hold the air over the aileron surface which is particularly desired when there is turbulence at low altitudes and the aircraft may be losing air because of the turbulence or because of the attitude of the aircraft.

While a detailed description of the modification kit for the DeHavilland Beaver and Otter aircraft has been given, it is to be understood that the invention is not limited therefor and various other changes and combinations may readily occur to those skilled in the art to which the invention relates. The invention, therefore, should be construed by reference of the accompanying claims.

What is claimed is:

1. A leading edge modification for the wing of a DeHavilland Beaver or Otter aircraft, said leading edge modification comprising a cuff extending forwardly from the leading edge of the unmodified wing and being fitted over a plurality of blocks mounted intermittently across the width of said leading edge, said cuff extending smoothly from the top of said wing in a generally convex profile to a point approximately 2 inches forwardly and 4 inches below the forwardmost point of said wing, said cuff then extending in a generally linear line rearwardly to the bottom of said wing at a point approximately 7 inches rearwardly of said forwardmost point of said wing.

2. A leading edge modification as in claim 1 and further comprising a droop tip for the outboard end of said wing, said droop tip fitting smoothly with said leading edge modification, said droop top having inboard, outboard, leading and trailing areas, said tip being generally concave at said trailing area between said inboard and outboard areas, the outboard and trailing areas being located below the outboard and leading edges of said tip, the outboard and rearward station lines of said wing tip being located at positions substantially identical with the positions of the original tip of said wing.

3. A leading edge modification as in claim 2 and further comprising a seal positioned within the gap between the respective flap and the trailing edge of each of said wings, said seal extending substantially the length of the flap cove of said aircraft and being attached to the bottom skin of said wing so as to be stationary relative thereto, said seal extending rearwardly from the leading edge of said flap over a distance such that the bottom of said flap is overlapped by said seal when said flap is in its retracted position and said seal closes a substantial portion of the gap between said flap and said wing when said flap is in its extended position.

4. A combination wing tip and leading edge modification for a DeHavilland Beaver or Otter aircraft, said wing tip modification having inboard, outboard, leading and trailing areas, said wing tip modification being generally concave at said trailing edge between said inboard and outboard positions and the outboard and trailing edge of said wing tip modification being located below the outboard and leading edge of the original tip of said wing, said outboard and rearward station lines of said wing tip modification being substantially identical with the outboard and rearward station lines of the original tip of said wing, said leading edge modification comprising a cuff extending forwardly from the leading edge of the unmodified wing and being fitted over a plurality of blocks mounted intermittently across the width of said leading edge, said cuff extending smoothly from the top of said wing in a generally convex profile to a point approximately two (2) inches forwardly and four (4) inches below the forwardmost point of said wing, said cuff then extending in a generally linear line rearwardly to the bottom of said wing at a point approximately seven (7) inches rearwardly of said forwardmost point of said wing, said wing tip fitting smoothly with said leading edge modification.

5. A wing tip as in claim 4 and further comprising a seal positioned within the gap between the respective flap and the trailing edge of each wing on a DeHavilland Beaver aircraft, said seal extending substantially the length of the flap cove of said aircraft and being attached to the bottom skin of said wing so as to be stationary relative thereto, said seal extending rearwardly from the leading edge of said flap over a distance such that the bottom of said flap is overlapped by said seal when said flap is in the retracted position and said seal closes a substantial portion of the gap between said flap and said wing when said flap is in the extended position.

6. A seal positioned within the gap between the respective flap and the trailing edge of each wing on a DeHavilland Beaver aircraft, said seal extending substantially the length of the flap cove of said aircraft and being attached to the bottom skin of said wing so as to be stationary relative thereto, said seal extending rearwardly from the leading edge of said flap over a distance such that the bottom of said flap is overlapped by said seal when said flap is in its retracted position and said seal closes a substantial portion of the gap between said flap and said wing when said flap is in its extended position.

7. A seal as in claim 6 and further comprising a leading edge modification comprising a cuff extending forwardly from the leading edge of the unmodified wing and being fitted over a plurality of blocks mounted intermittently across in width of said leading edge, said cuff extending smoothly from the top of said wing in a generally convex profile to a point approximately two (2) inches forwardly and four (4) inches below the forwardmost point of said wing, said cuff then extending in a generally linear line rearwardly to the bottom of said wing at a point approximately seven (7) inches rearwardly of said forwardmost point of said wing.

8. A seal as in claim 7 and further comprising a wing tip, said wing tip having inboard, outboard, leading and trailing areas, said wing tip being generally concave at said trailing edge between said inboard and outboard positions and the outboard and trailing edges being located below the outboard and leading edges of the original tip of said wing.

* * * * *